INVENTOR.
JAMES J. PELOUCH

INVENTOR.
JAMES J. PELOUCH

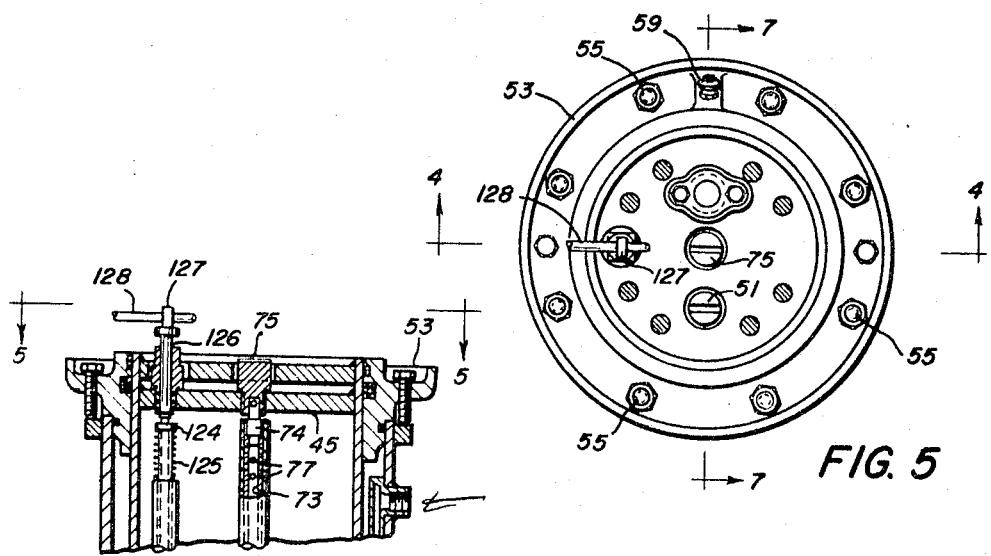
FIG. 5
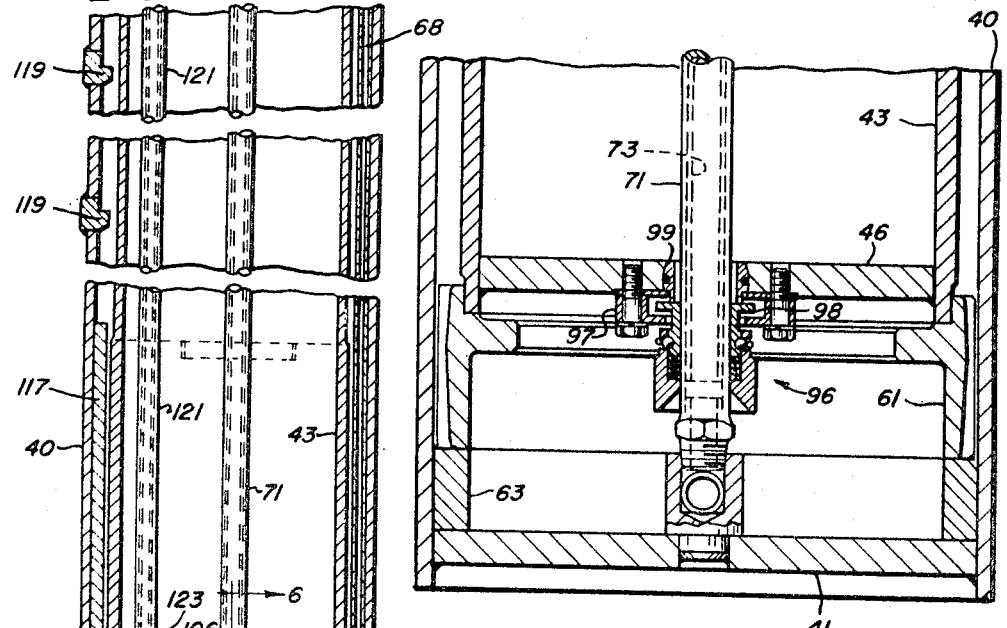
FIG. 6
FIG. 4
INVENTOR.
JAMES J. PELOUCH
BY
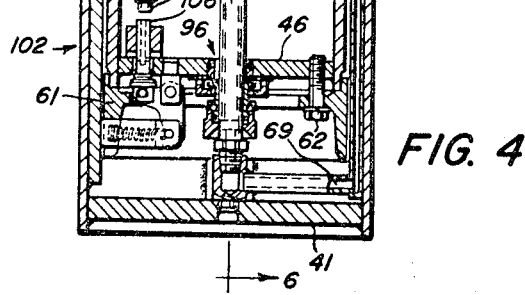
Attys June 3, 1969

J. J. PELOUCH 3,447,421

VEHICLE LIFT

Original Filed June 14, 1967

INVENTOR.
JAMES J. PELOUCH
BY
Woodling, Krost, Granger & Rust
Attys

INVENTOR.
JAMES J. PELOUCH

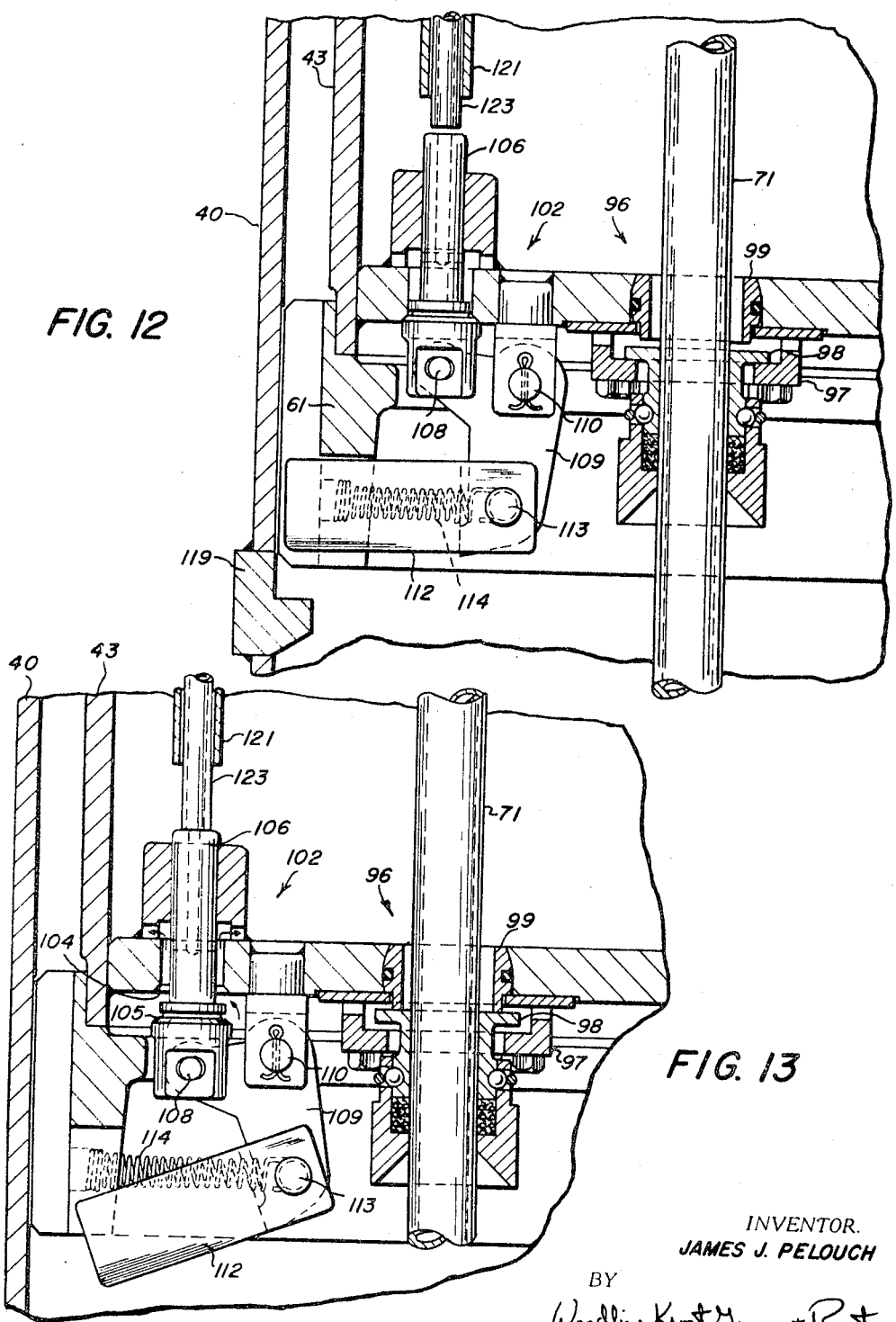

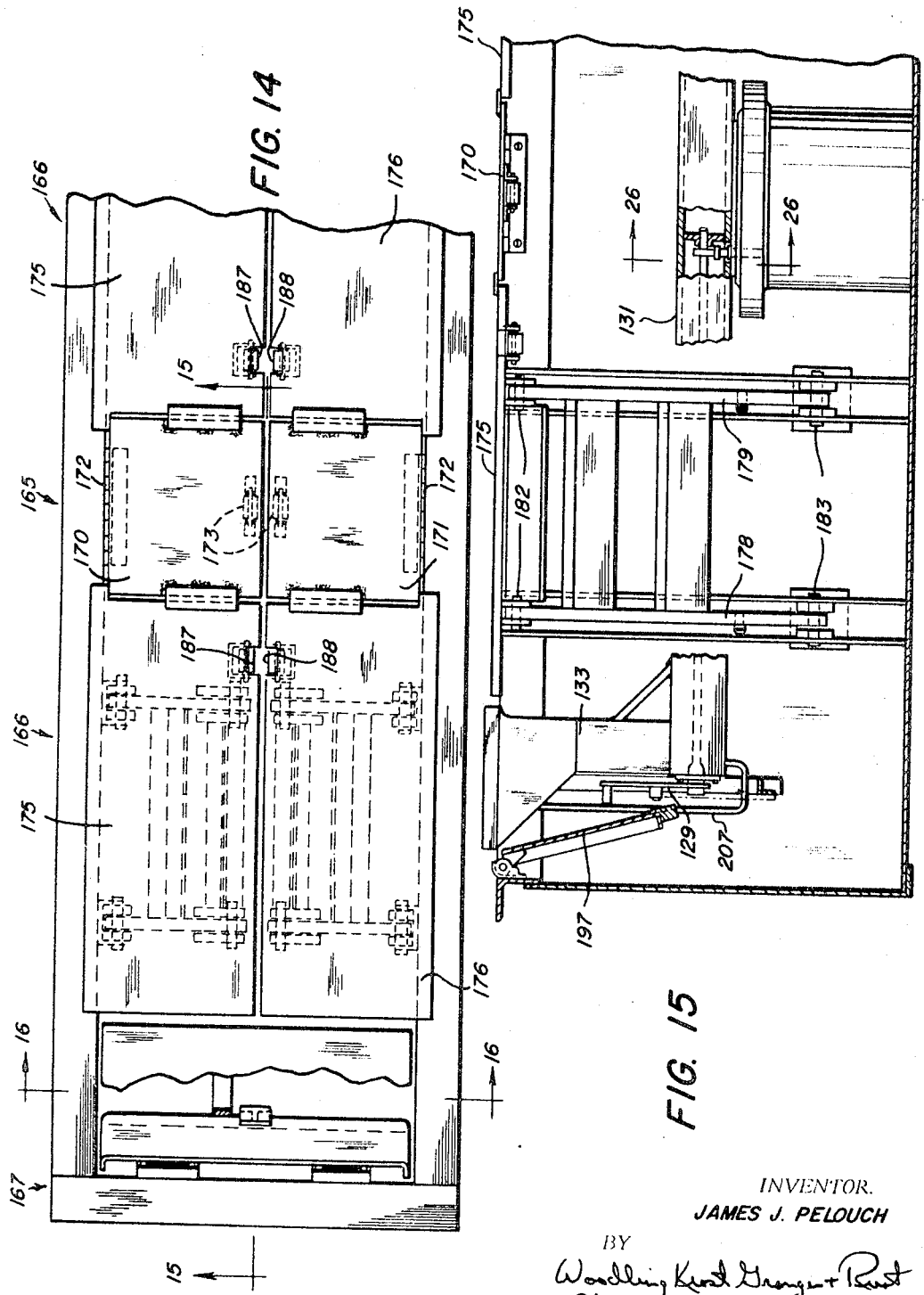

INVENTOR.
JAMES J. PELOUCH
BY
Woodling Krost Granger & Rust
Attys.

INVENTOR.
JAMES J. PELOUCH

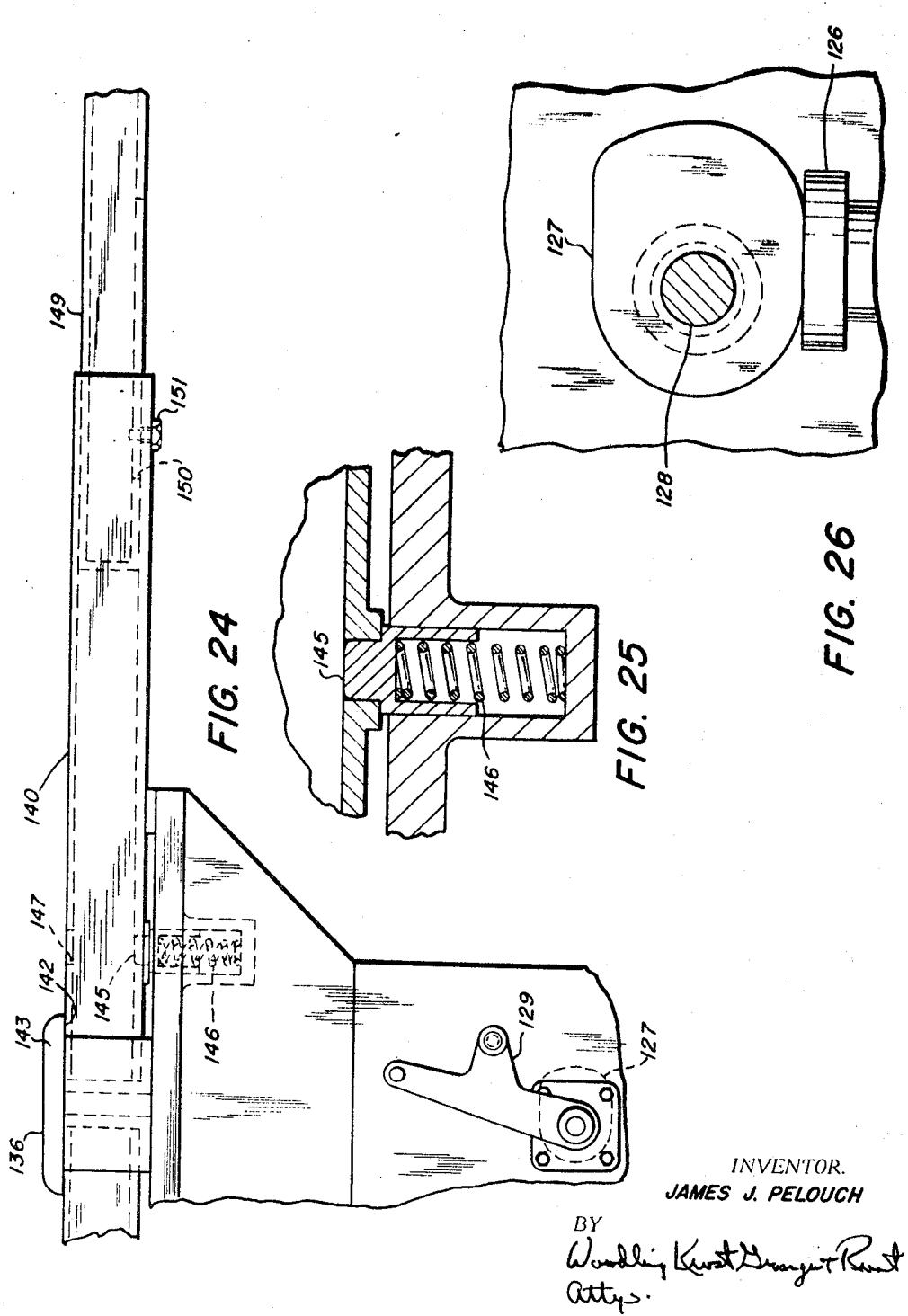

INVENTOR.
JAMES J. PELOUCH

United States Patent Office 3,447,421
Patented June 3, 1969

3,447,421
VEHICLE LIFT
James J. Pelouch, 7041 Hilton Road,
Brecksville, Ohio 44141
Application June 14, 1967, Ser. No. 646,113, now Patent
No. 3,393,772, dated July 23, 1968, which is a continuation-in-part of application Ser. No. 402,433, Oct. 8,
1964, now abandoned. Divided and this application June
3, 1968, Ser. No. 734,128
Int. Cl. F15b 21/04, 13/04, 11/08
U.S. Cl. 91—4                                  5 Claims

ABSTRACT OF THE DISCLOSURE

A piston and cylinder arrangement particularly adapted for use in a vehicle lift comprising a hollow piston construction located within a cylinder and movable between upper and lower positions therein. Hydraulic fluid is contained within the piston and an air supply tube extends into the piston and includes restricted opening means for permitting a low airflow rate into the piston in the lower position thereof and permits a high airflow rate into the piston in positions above the referred to lower position. A float type air valve is located in the upper end portion of the piston and is held in closed position by the float in the lower position of the piston when sufficient hydraulic fluid level is contained in the piston and when there is insufficient hydraulic fluid level in the piston, the air valve is maintained in open position and the low airflow rate is insufficient to close the same. The high airflow rate in positions of the piston above the referred to lower position of the piston is sufficient to hold the air valve closed regardless of the hydraulic fluid level. A check valve is located in the lower end portion of the piston and is movable between open and closed positions. This valve is open in the upward movement of the piston permitting hydraulic fluid flow from the piston to the cylinder and this valve is in the closed position upon downward movement of the piston, thereby prohibiting hydraulic fluid flow from the cylinder to the piston. A control valve is located in the lower end portion of the piston and is movable between an open position whereat fluid flow is permitting between the piston and cylinder and a closed position whereat fluid flow is prohibited between the piston and the cylinder. The structure is also provided with a safety latch member connected to the control valve which is engageable with stops positioned along the cylinder wall and this latch member is biased toward the latched position. The latch member is unlatched in the open position of the control valve and is moved to a latched position in the closed position of the control valve.

---

This application is a division of U.S. Ser. No. 646,113 filed June 14, 1967, now Patent No. 3,393,772 issued July 23, 1968, which was a continuation-in-part of U.S. Ser. No. 402,433 filed Oct. 8, 1964 which Ser. No. 402,433 has now been abandoned.

The present invention relates in general to vehicle lifts and more particularly to a lift construction which is improved with respect to the superstructure as well as the piston and cylinder arrangement.

An object of the present invention is to provide a vehicle lift which has more working room underneath the vehicle, with the present construction making practically all parts of the underside of the vehicle exposed.

Another object of the present invention is to provide a vehicle lift of the single post type which includes a single lifting piston connected to a single dropped transverse cross beam member with vertical support members connected to the opposite ends of the cross beam with telescoping vehicle engaging members mounted on the tops of the vertical support members.

Another object of the persent invention is to provide what is commonly referred to in the art as a full hydraulic lift without the necessity of utilizing what is commonly referred to as the "air-oil tank."

Another object of the present invention is to provide a vehicle lift with the safety mechanism for preventing accidental lowering of the lift, commonly referred to as the safety leg, provided in a totally enclosed manner on the inside of the cylinder mechanism.

Another object of the present invention is to provide a vehicle lift which can handle vehicles of substantial weight.

Another object of the present invention is to provide a vehicle lift which is capable of handling a wide range of vehicle sizes.

Another object of the present invention is to provide a vehicle lift which, when in its raised position, has a mechanism whereby a mechanic can control the lowering and stopping of the lift right at the lift superstructure.

Another object of the present invention is to provide a vehicle lift with a safety provision whereby the lift will not raise in its lower position unless there is a sufficient hydraulic fluid level.

Another object of the present invention is to provide a vehicle lift of the single post type which in its completely lowered position contains no structure which is above the floor level which is within the width of the vehicle wheels but rather is outside of the vehicle wheel width whereby a vehicle can be driven into position relative to the lift without meeting any obstructions.

Another object of the present invention is to provide a lift construction which includes a chamber or enclosure to receive the superstructure of the lift in its lowered position with a convenient door or closure construction for closing the chamber in both the raised and lowered positions of the lift.

Another object of the present invention is to provide a new and improved vehicle engaging pad construction.

Other objects and a fuller understanding of this invention may be had by referring to the following description and claims, taken in conjunction with the accompanying drawings, in which:

FIGURE 4 is an elevational view in section of the piston and cylinder construction of the vehicle lift and taken generally along the line 4—4 of FIGURE 5;

FIGURE 5 is a plan view of the piston and cylinder construction and is taken generally along the line 5—5 of FIGURE 4;

FIGURE 6 is a view taken generally along the line 6—6 of FIGURE 4;

FIGURE 12 is an enlarged fragmentary view of the same portion of the piston shown in FIGURES 10 and 11 showing the piston in a raised position;

FIGURE 13 is an enlarged fragmentary view of the same portion of the piston as shown in FIGURES 10 through 12 and in a raised position with the parts in position to permit lowering of the piston;

FIGURE 14 is a fragmentary plan view of the closure mechanism which is utilized to cover the chamber or closure which houses the superstructure in the lower position of the lift;

FIGURE 15 is a view taken generally along the line 15—15 of FIGURE 14;

FIGURE 24 is a fragmentary enlarged view taken in the same direction as FIGURE 2;

FIGURE 25 is an enlarged view of a portion of FIGURE 24;

FIGURE 26 is an enlarged side view of the cam shown in FIGURES 1, 4 and 9;

Figure 1:
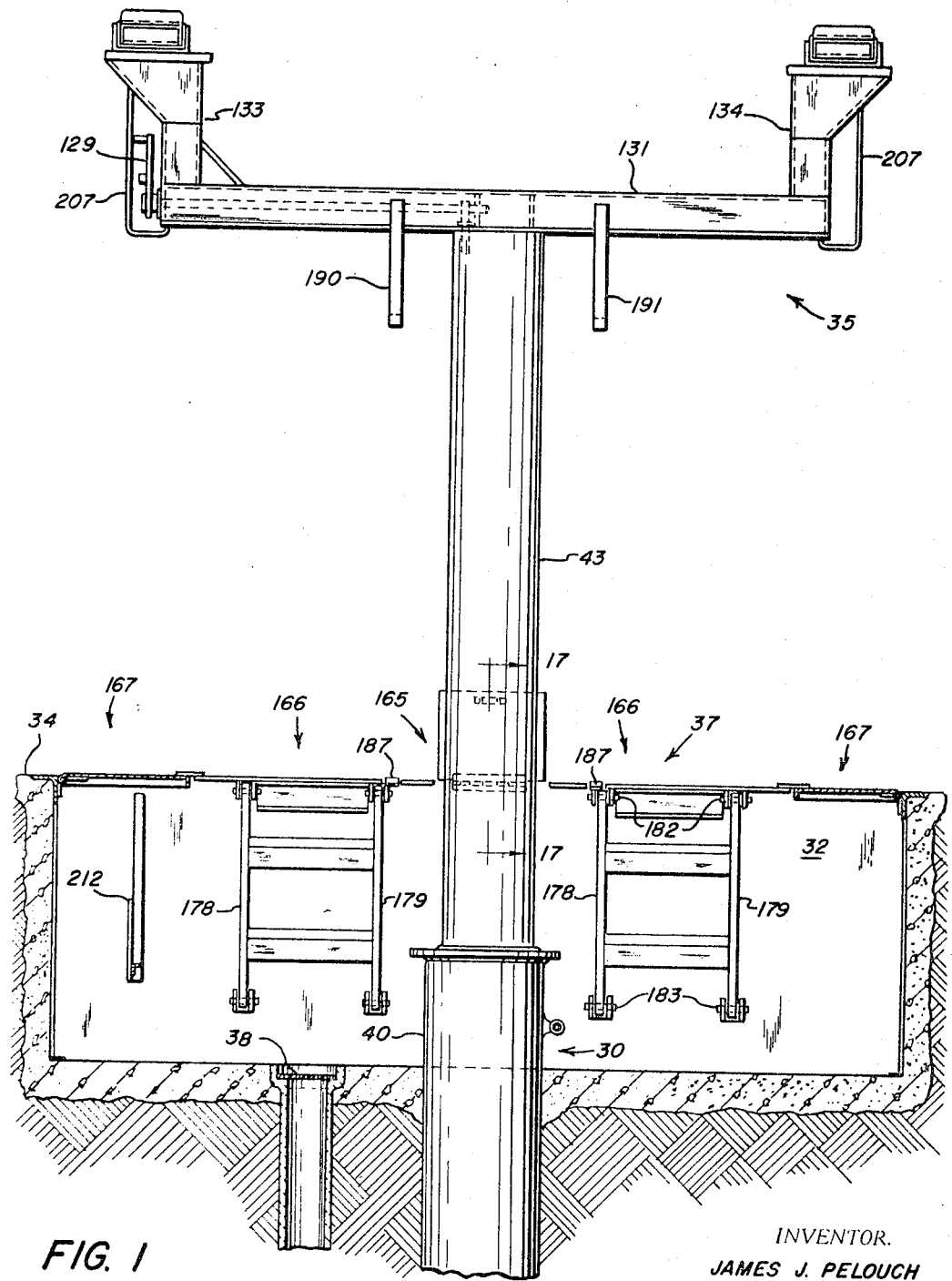
FIGURE 1 is an elevational view partially in section showing the overall construction of the vehicle lift to the present invention with the vehicle lift being shown in its raised position.
Figure 3:
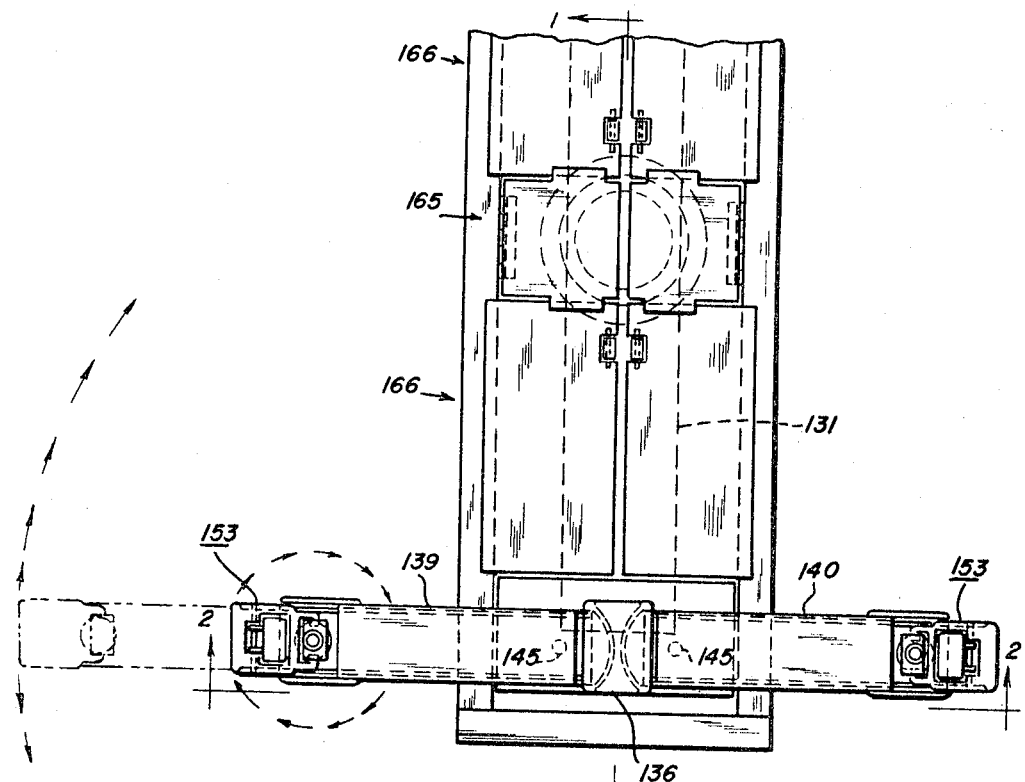
FIGURE 3 is a fragmentary plan view of a portion of the lift and showing the lift in its lowered position.

The vehicle lift of the present invention is illustrated generally in FIGURES 1, 2 and 3 and as shown in these figures, includes what is commonly referred to in the art as the jack 30 which is primarily the piston and cylinder arrangement which is at least partially contained within an enclosure or chamber 32 located below a floor level 34. The length of the enclosure is seen in FIGURE 1 and the width in FIGURE 2 and it will be noted that the jack is positioned centrally therein. A superstructure 35 is connected to, and is adapted to be raised and lowered by the jack 30 and the superstructure serves the function of carrying the vehicle engaging mechanism which is to be raised and lowered by the jack. A closure mechanism 37 serves the function of covering the chamber 32 in the raised position of the vehicle lift so that a mechanic may conveniently walk beneath the vehicle carried by the superstructure and this closure mechanism also serves to cover or enclose the superstructure in its lowermost position. A drain 38 is shown in FIGURE 1 for conveniently removing water and other fluids from the chamber 32.

The construction of the jack 30 as shown in detail for example in FIGURES 4 through 13 includes primarily a cylinder 40 which has upper and lower end portions with the lower end being closed by end member 41 and positioned within the cylinder is a piston 43 which is of what may be commonly referred to as a hollow construction being formed by closing the upper end of the piston by means of a plate 45 and closing the lower end portion of the piston by means of a plate 46. The piston is adapted for vertical movement between a lower position as shown in FIGURE 4 and an upper position shown for example in FIGURE 1 of the drawings. As noted in FIGURES 1 and 2, the cylinder 40 is located within the enclosure 32 with the lower portion of the cylinder extending below the lower level of the enclosure and with the upper portion of the cylinder extending to a position within the confines of the enclosure.

The hollow piston and cylinder arrangement just described is adapted to contain hydraulic fluid to a predetermined safe level indicated by the reference numeral 48 (FIGURE 7) and this hydraulic fluid is adapted to be introduced through conduit 50 which is in communication with the interior of the hollow piston construction which conduit is closed by a threaded dip stick 51 which can be conveniently used to check the hydraulic fluid level. An upper bearing member 53 is positioned between the piston and cylinder and is secured in a fixed position relative to the cylinder by means of bolts 55 and serves to carry packing material 56 which makes a good fluid seal for the outside wall of the piston which moves relative thereto. The bearing member 53 is provided with a passage 58 which leads from the annular space between the piston and cylinder to the atmosphere and is normally closed by a threaded plug 59. The purpose of passage 58 is to permit trapped air to be expelled from the piston and cylinder arrangement when the construction is originally filled with hydraulic fluid. This of course is accomplished by removing the plug 59 which is replaced after the constructon is filled with hydraulic fluid. As will be noted, particularly in FIGURES 4 and 6, the bottom end of the piston 43 has an annular engagement member 61 fixedly secured thereto by means of bolts 62 and this annular engagement member is adapted to engage a ring 63 which is carried by the end member 41 which serves to close the bottom of the cylinder.

Air under pressure is introduced into the hollow piston construction from a source of air pressure not shown but which might be a conventional air compressor which passes by way of a conduit 65 through a valve 66 (FIGURE 2) and to the cylinder 40. A flattened tube 68 is vertically mounted on the inside wall of the cylinder 40 which transmits the air to a cross pipe 69 at the bottom of the cylinder which in turn is connected to an air supply tube or pipe 71 which extends axially from the bottom of the cylinder through the lower plate 46 of the piston and vertically through the piston to the upper portion thereof in its lowermost position which is shown in FIGURE 4. The valve 66 is a conventional valve which in the position shown is in the off position and when the handle is moved in one direction permits the passage of compressed air from the source to the piston and cylinder arrangement and when moved in another direction permits the exhausting of air from the cylinder and piston construction to atmosphere.

Figure 9:
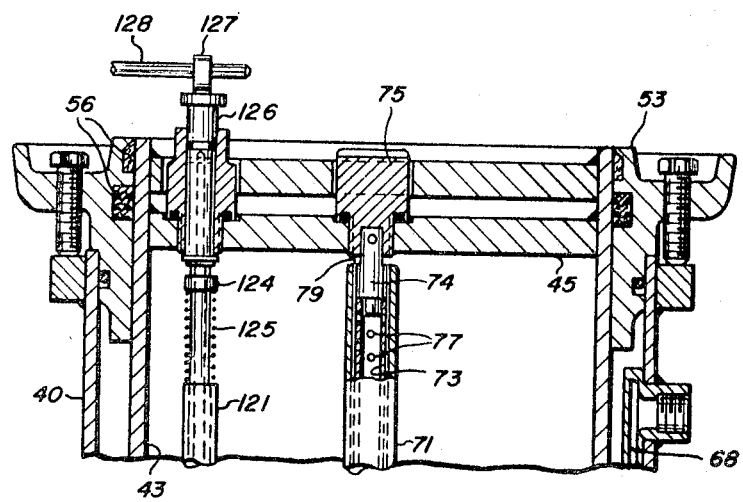
FIGURE 9 is an enlarged view of the upper portion of the piston and cylinder arrangement which is shown in FIGURE 4.

A telescoping tube 73 is positioned within the air supply tube 71 as shown in FIGURE 4 and this tube 73 is secured to a closure or plug member 74 which in turn is secured to the plate 45 by means of another member 75. The upper end of the telescoping tube 73 is provided with a plurality of air openings 77 which serve to transmit compressed air from the central portion of the tube 73 to the space between the outside of the tube wall 73 and the inside of the air supply tube 71. The closure or plug member 74 is constructed with a predetermined clearance between the outside perimeter thereof and the inside circumference of the air supply tube so as to provide a restricted opening which is identified by the reference numeral 79 (FIGURE 9). It will thus be seen that in the position of the piston and cylinder shown in FIGURE 4, when compressed air is introduced into the tube 73 the rate of flow of compressed air to the space between the upper surface of the hydraulic fluid 48 and the plate 45 initially will be quite slow. Since the telescoping tube 73 is secured to the piston and moves therewith it will be appreciated that as soon as the openings 77 clear the top of the air supply tube 71 that the rate of flow of compressed air into this space will be much more rapid.

The plate 45 which serves to close the upper end of the piston is provided with wall means which defines an opening therethrough. Positioned within the opening is an air valve assembly (FIGURE 7) indicated generally by the reference numeral 81 and this air valve assembly includes a closure member 83 secured in this opening and provided with a valve seat 84 (FIGURE 8). Passageway means 85 are provided through the closure member and serve to provide for fluid communication between the hollow piston construction and atmosphere. A guide 87 is located in the hollow piston construction and is secured to the plate 45 and located within this guide is a float member 88 which has secured thereto a rod 89 which extends to a valve 90. The closure member 83 also includes what is referred to as an annular entranceway 92 which serves to house the valve 90 and by means of a pin 93 serves to limit the lowermost vertical movement of the valve. Wall means are provided in the annular entranceway between the valve and the valve seat in the open position of the valve to define openings 94 for the passage of air.

Figure 7:
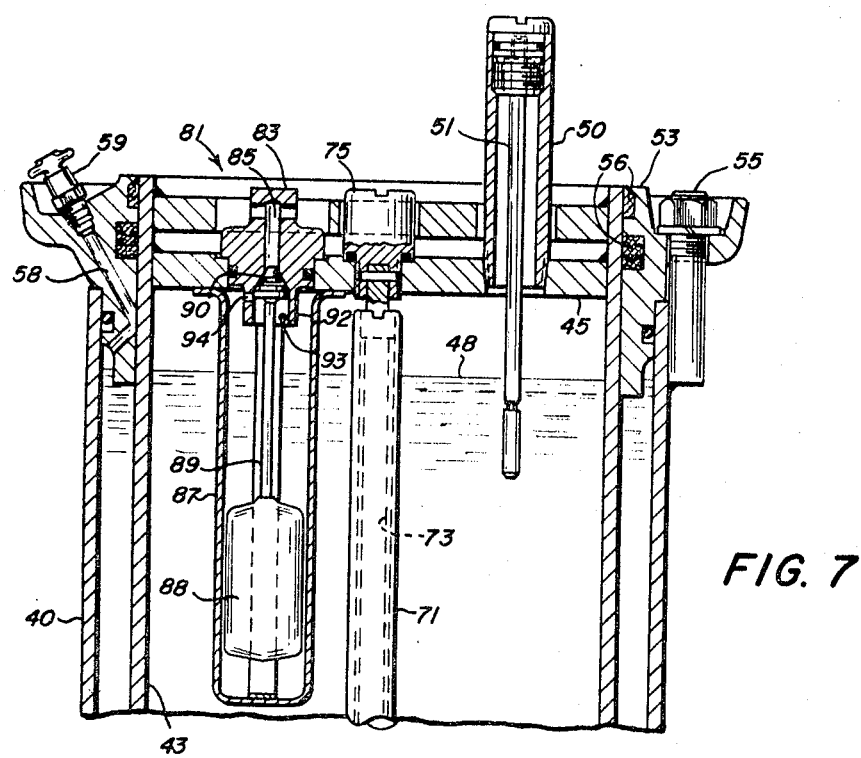
FIGURE 7 is an enlarged view of the upper portion of the piston and cylinder construction showing an air safety valve which is utilized to permit raising of the piston only upon there being sufficient fluid level in the construction.
Figure 8:
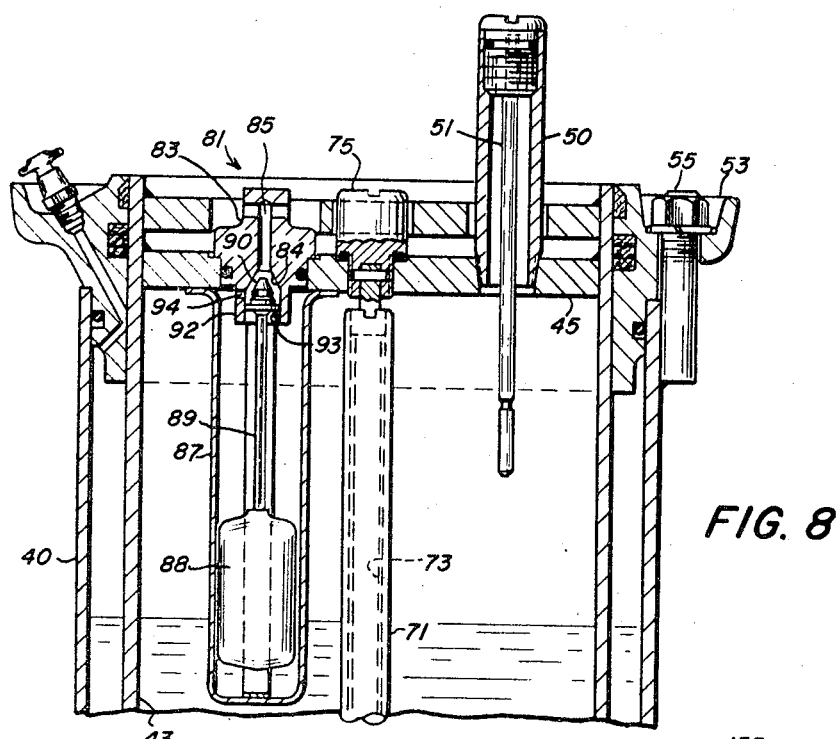
FIGURE 8 is a view identical to FIGURE 7 with the exception that the hydraulic fluid level is shown at an unsafe level and the safety air valve is shown in an open position.

With the proper hydraulic fluid level, the float member 88 is buoyed up and maintains the valve 90 in the closed position in which it is shown in FIGURE 7. If the fluid level has dropped to a dangerously low position the float will not be buoyed up (FIGURE 8) and the valve 90 will move or drop to its open position, best seen in FIGURE 8. The openings 94 are designed to more than transmit the volume of compressed air that will pass through the restricted opening 79 in the lower position of the piston. As a result with the piston in its lowermost position and with the hydraulic fluid at a dangerously low level as indicated in FIGURE 8, the introduction of compressed air into the piston by manipulating of the valve 66 and passage of the air through the restricted opening 79 will not result in a building up of air pressure in the upper portion of the piston since all of the compressed air will be transmitted through the openings 94 and by way of the passageway means 85 to atmosphere. It will be apparent, however, that with sufficient hydraulic fluid in the piston, the valve 90 will be maintained in its closed position and the hereinbefore described introduction of compressed air into the hollow piston construction will result in a pressure build-up with subsequent upward movement of the piston and upward movement of the telescoping tube 73 and exposure of the air openings 77 directly into the hollow piston construction with a resulting rapid introduction of compressed air thereinto and subsequent rapid lifting of the superstructure carried by the piston.

A check valve construction 96 is carried by the plate 46 which closes the lower end of the piston 43 and this check valve construction surrounds the air supply tube 71 at the point where it passes through the plate 46. The check valve construction comprises a retaining member 97 and a movable valve portion 98 which is adapted to move into and out of engagement with a member 99 which serves as a valve seat. Upon upward movement of the piston the pressure or force action of the hydraulic fluid contained within the hollow piston construction tends to maintain the valve portion 98 of the assembly open and fluid passes through the valve assembly in the direction of the arrows shown in FIGURE 11. When the piston is being lowered which will be described in more detail hereinafter, the valve portion 98 is maintained in a closed condition as shown in FIGURE 13 and this closed condition is due to the force exerted by the hydraulic fluid acting on the lower or underside portion of the valve 98.

A hydraulic control valve 102 is also located in the plate 46 and includes a valve seat 104 and valve 105 adapted to move between open and closed positions relative thereto. The valve 105 is provided with a stem portion 106. The lower end portion of the valve 105 is pivotally connected at 108 to a plate 109 which in turn is pivoted at 110 and a latch 112 is pivotally connected at 113 to the plate 109. A spring 114 is connected at one end to the pivot 113 and at the other end to the annular engagement member 61 and serves to constantly urge the latch member toward the wall of the cylinder 40 and because of the connection of the latch to the valve 105 always tends to urge the valve to a closed condition. What has been referred to as an interference bar 117 is fixedly connected to the inner wall of the cylinder 40 (best seen in FIGURE 4) and this interference bar extends a predetermined vertical distance. Within the limit of the extent of the interference bar, the latch 112 is maintained from complete movement to the left for example as seen in FIGURE 4 and as a result the valve 105 is maintained in an open condition. Positioned above the interference bar at intervals are safety stops 119 fixedly connected to the wall of the cylinder and these safety stops serve to engage the latch 112 or to be in a position to engage the latch 112 in the upper position of the piston so as to provide a mechanical safety feature to prevent accidental lowering of the lift for example if for some reason the hydraulic fluid should suddenly drain out of the assembly. A guide tube 121 is carried by the inside wall of the piston 43 in a vertical position and generally in line with the stem portion 106 of the valve 105. An actauting rod 123 is located within the guide tube and has a lower end portion adapted for engagement with the stem portion 106 of the valve 105 and has an upper shouldered end 124 which is acted upon by means of a spring which is carried at one end on the upper edge of the guide tube 121 to maintain the actuating rod normally in a given position. An engaging pin 126 extends through the plate 45 and serves as a means for moving the actuating rod 123 from a position outside of the hollow piston construction. The engaging pin is in turn adapted to be moved by a cam member 127 (FIGURES 1, 4 and 26) carried on shaft 128 which is suitably journalled in the superstructure and which in turn is connected to lever 129 (FIGURES 1 and 2) conveniently located on the superstructure for convenient manipulation by an operator of the vehicle lift. As a result it will be seen that the check valve assembly 96 permits fluid to be conducted from the hollow piston construction to the cylinder upon upward movement of the piston but is maintained in a closed position upon downward movement of the piston within the vertical limits of the interference bar 117. Above the vertical limit of the interference bar, however, the check valve assembly 96 permits the upward movement of the piston by transferring hydraulic fluid from the piston to the cylinder since the hydraulic control valve 102 is closed above the interference bar with the exception of when it momentarily passes over one of the safety stops 119. Further function of the construction just described will be discussed in the complete description of the operation of the device.

The superstructure 35 which is carried by the jack 30 includes a single generally horizontally disposed box-type cross beam 131 which is connected intermediate its first and second portions to the piston 43. First and second vertical support members or stanchions 133 and 134 are respectively connected to the first and second end portions of the cross beam 131. The vertical height of the support members 133 and 134 may be varied within commercial limits so as to accommodate various heights between the top of the beam 131 and a vehicle carried on structure which will be described more fully hereinafter. However, it should be appreciated that these vertical support members serve to maintain the vehicle a sufficient distance above the cross beam so as to in effect provide a practically unobstructed underside of the vehicle and as a result a mechanic may work on any portion of the underside of the vehicle. It is preferable that the height of members 133 and 134 be on the order of at least fifteen to eighteen inches as seen in the drawings. Mounting supports 136 are respectively positioned on the upper surface of the stanchions 133 and 134 and each of the mounting supports is adapted to pivotally carry swinging arms 139 and 140. Each of the swinging arms includes an end 142 physically supported by a portion 143 (FIGURE 24) of its respective mounting support, A pivot member 145 serves to pivotally mount the arms and this pivot member is constantly urged to an effective position by means of a spring 146. The reason for this construction is that it permits ease of removal of the swinging arm when desired by merely inserting a tool through an opening 147 in the arm immediately above the pivot member and depressing the same so as to permit the arm to be removed. Each of the swinging arms is provided with a telescoping arm 149 and the limit of movement of the telescoping arm is determined by means of a slot 150 in the telescoping arm and a stop screw 151 which is carried by the respective swinging arm. The end portion of each of the telescoping arms is provided with a vehicle engaging pad member 153.

Figures 20, 21:
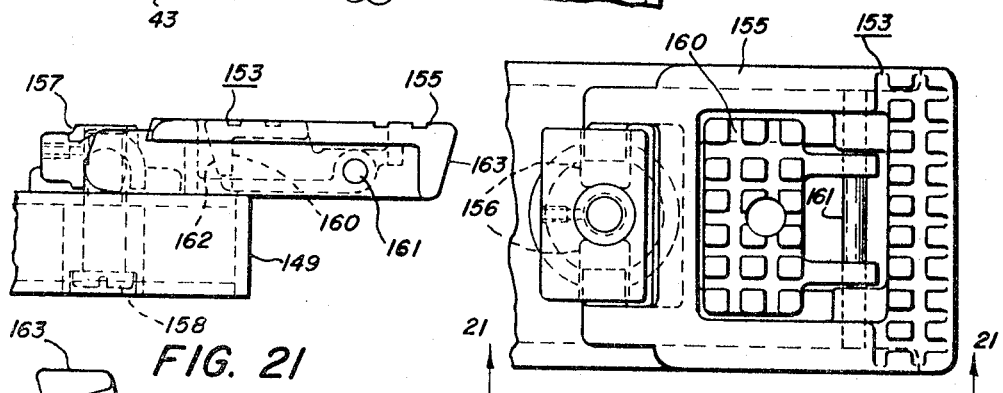
FIGURE 20 is a plan view of one of the pad members shown in FIGURES 2 and 3.
FIGURE 21 is a view taken generally along the line 21—21 of FIGURE 20.
Figure 22:
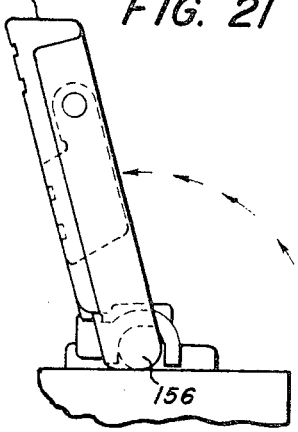
FIGURE 22 is a view showing the pad member in one of its vehicle engaging positions.
Figure 23:
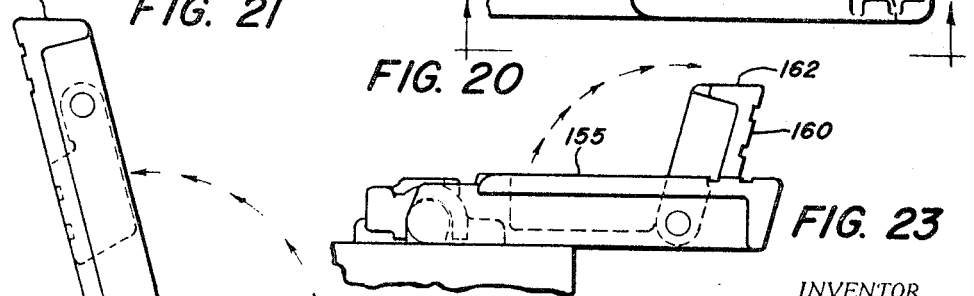
FIGURE 23 is a view showing the pad member in another of its vehicle engaging positions.

Each of the pad members 153 comprises a main body member 155 which has integrally formed therewith pivot members 156 which are held in a captured position by means of a domed mounting member 157, which in turn is maintained in position by a threaded member 158 which extends through the end of a telescoping arm and into member 157. Member 158 also permits rotation of the pad through 360 degrees. An auxiliary member 160 is carried by the main body 155 and is pivotally mounted by means of pivot member 161 for pivotal movement from the position shown in FIGURES 20 and 21 to the position shown in FIGURE 23 and also schematically indicated in FIGURE 2. This particular member permits the same to be adjusted between three particular positions whereby the device will accommodate the engagement of vehicles at different places. The position of the pad shown in FIGURES 20 and 21 will permit the engagement of a vehicle at one level and the auxiliary member 160 may be pivoted about member 161 to the position shown in FIGURE 23 and in this position a surface 162 may engage for example the frame of a vehicle. If a still higher vertical height is needed, the auxiliary member may be returned to its flush position with the main body 155 and the main body may be pivoted about members 156 to the position shown in FIGURE 22 whereat a surface 163 is adapted to engage for example the frame of a vehicle. As indicated in FIGURES 22 and 23 each is swung through slightly over 90 degrees to an active position and when so swung the surfaces 162 and 163 are substantially horizontal. In the active position a shoulder on member 155 engages member 157 and a shoulder on member 160 engages member 155. Obviously, in the position of FIGURES 20 and 21, the pad may engage the frame of a vehicle at even a lower level.

The closure mechanism as described very briefly hereinabove serves the function of covering the enclosure 32 whereby a mechanic may conveniently walk underneath the vehicle carried by the superstructure when the lift is in its raised position and also enables the same to be accomplished when the vehicle lift is lowered. It will be appreciated from viewing the drawings, but it should also be mentioned at this point, that in the completely lowered position of the vehicle lift everything is located below floor level with the exception of the swinging arms and the telescoping arms carried thereby and the pad members carried by the telescoping arms. These elements are normally aligned in the position shown in FIGURE 3 and an important feature of the present invention relates to the fact that the stanchions or support members 133 and 134 are so positioned on the cross beam as to locate the arms and mounting supports outside the width of the wheels of the vehicles the lift is adapted to accommodate. In other words, all vehicles are driven into position relative to the lift between the arms.

The structure for opening and closing the enclosure 32 to enable the lift to be raised and lowered is best appreciated from a review of FIGURES 1 and 14 through 19. The closure mechanism includes first, second and third sets of door meanns identified by the reference numerals 165, 166 and 167. The first set of door means 165 comprises two door members 170 and 171 (FIGURE 17) pivoted at 172 and each is provided with rollers 173 for engagement with the outer circumference of the piston of the lift. These doors operate merely by the piston engaging the rollers 173 upon opening of the same to raise the lift and upon lowering of the piston the doors close by the action of gravity.

The second set of door means comprises first and second pairs of laterally movable door members and the first and second pairs are located on opposite sides of the first set of door means 165 and are identical. As a result, only one pair of the doors will be described. Each pair of doors of the second set includes doors 175 and 176 which in their closed position are substantially flush with the floor level 34 and first and second pairs of links 178 and 179 are respectively connected to the inner ends of the doors 175 and 176 by means of pivots 182 and 183 respectively. The opposite ends of the pairs of links are pivotally connected to opposed sidewalls of the enclosure 32. With this particular linkage for mounting the doors 175 and 176, the doors are capable of moving from the full line position shown in FIGURE 16 to the dot-dash line position 185. The inner edge portions of the doors 175 and 176 are provided with rollers 187 and 188 (FIGURE 14). The cross beam 131 carries first and second wedge members 190 and 191 on the underside thereof on opposite sides of the piston 43 and each of the wedge members is also provided with a pair of engaging shoulders 193. With the superstructure in the raised position of FIGURE 1, the doors 175 and 176 are opened by the action of the wedge members engaging the rollers 187 and 188 which wedges the doors to the dot-dash line position 185 and the cross beam then travels into the enclosure 132. The doors are pulled to the full line position shown in FIGURE 16 by the action of a spring 195. When the superstructure is raised the doors are opened to the dot-dash position 185 to permit removal of the superstructure from the enclosure by means of the shoulders 193 engaging the links 178 and 179. Upon raising of the superstructure the doors again close by the action of the spring 195.

The third set of door means 167 includes an identical door 197 (FIGURES 18 and 19) at opposed ends of the enclosure 32 only one of which will be described. Each of the doors 197 includes hinges 199 and 200 and the door is constantly biased to closed position by means of springs 202 which act at each hinge. The side of the door 197 opposite the hinges is provided with a plate 204 which engages a portion of each of the doors 175 and 176 in the raised position of the lift in order to support the weight of a mechanic or other object. The superstructure carries a bumper 207 at either side portion thereof (FIGURE 15) and these bumpers are adapted to engage the doors 197 to push the door downwardly and to permit movement of the superstructure into the enclosure 32 upon lowering of the lift. The opening previously closed by door 197 is covered by the uppermost vertical portion of the stanchions 133 or 134 as the case may be.

Figure 2:
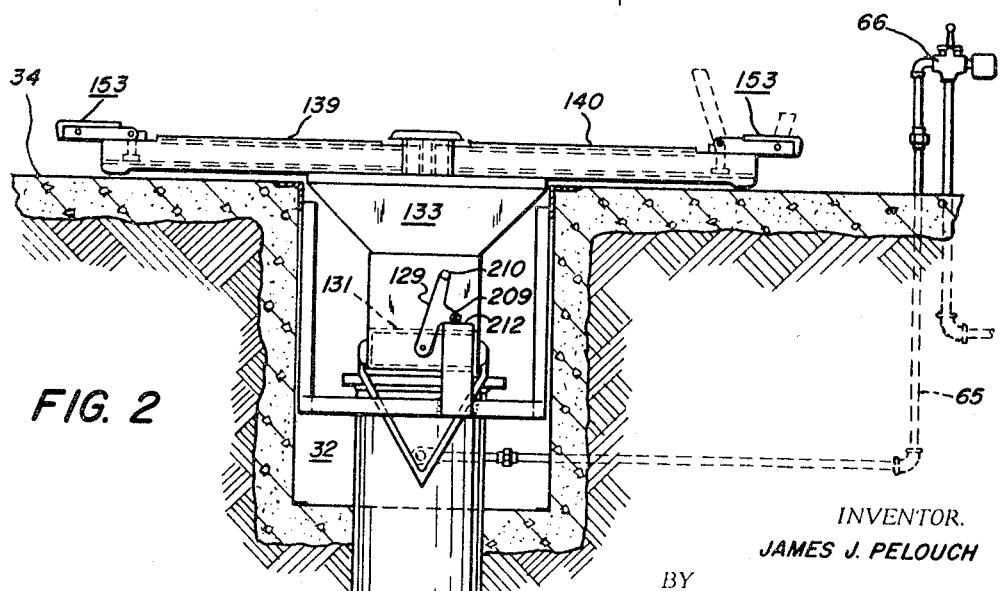
FIGURE 2 is an elevational view taken 90 degrees from the view of FIGURE 1 looking from the left end of FIGURE 1 and along the line 2—2 of FIGURE 3 and showing the vehicle lift in its lowered position.
Figure 16:
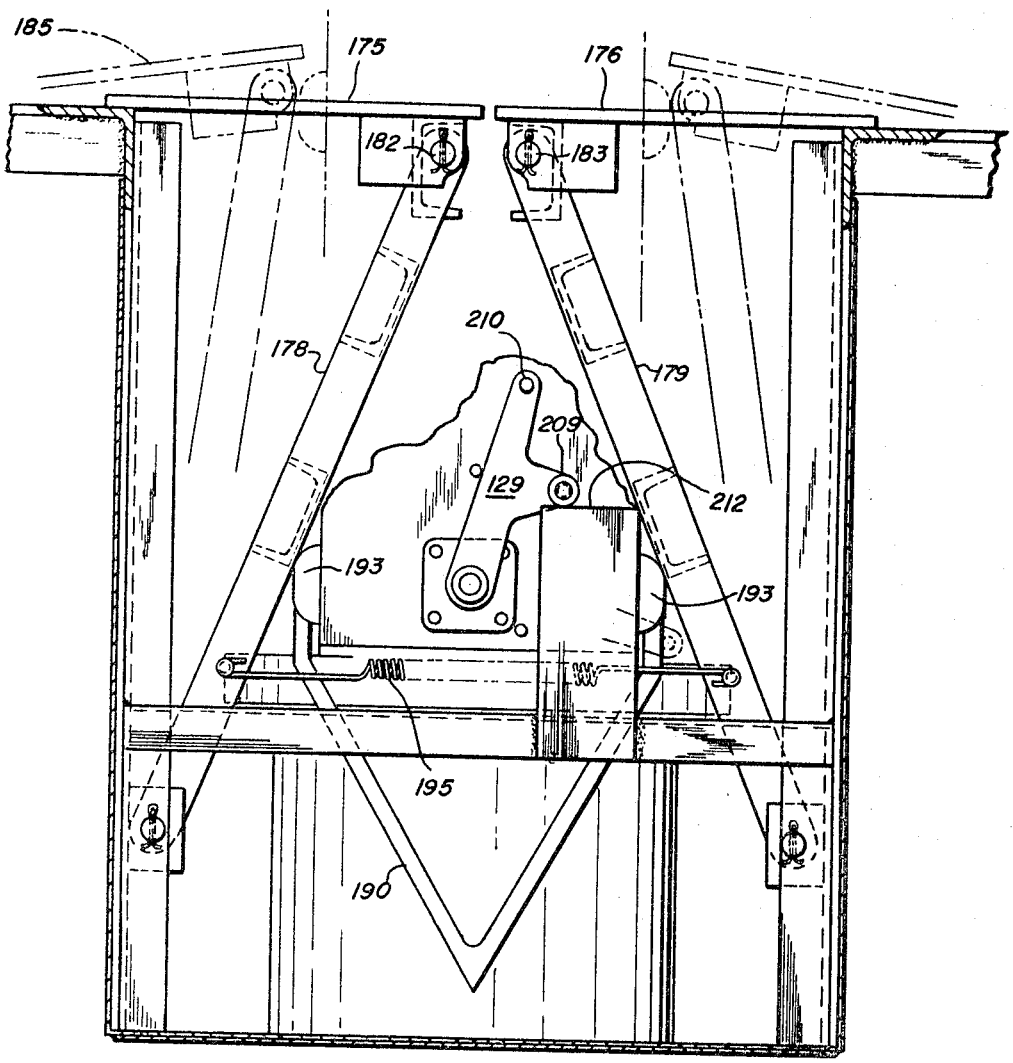
FIGURE 16 is an enlarged view taken generally along the line 16—16 of FIGURE 14.
Figure 17:
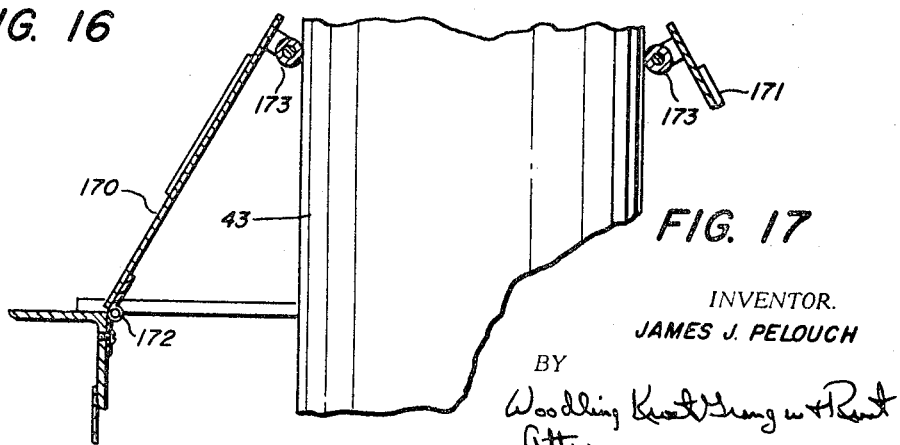
FIGURE 17 is a view taken generally along the line 17—17 of FIGURE 1.
Figure 18:
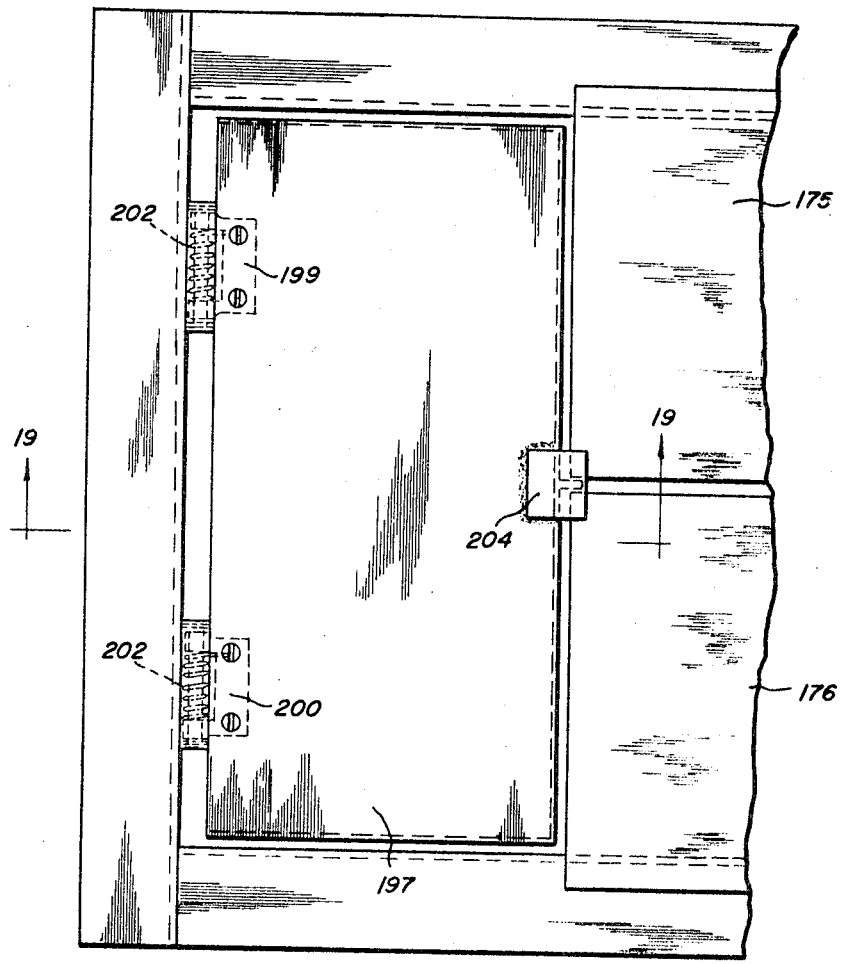
FIGURE 18 is an enlarged fragmentary plan view of a portion of that structure shown in FIGURE 14.
Figure 19:
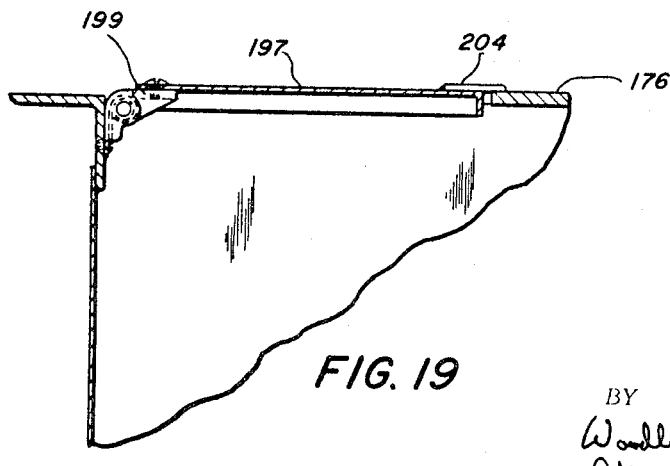
FIGURE 19 is a view taken generally along the line 19—19 of FIGURE 18.
Figure 27:
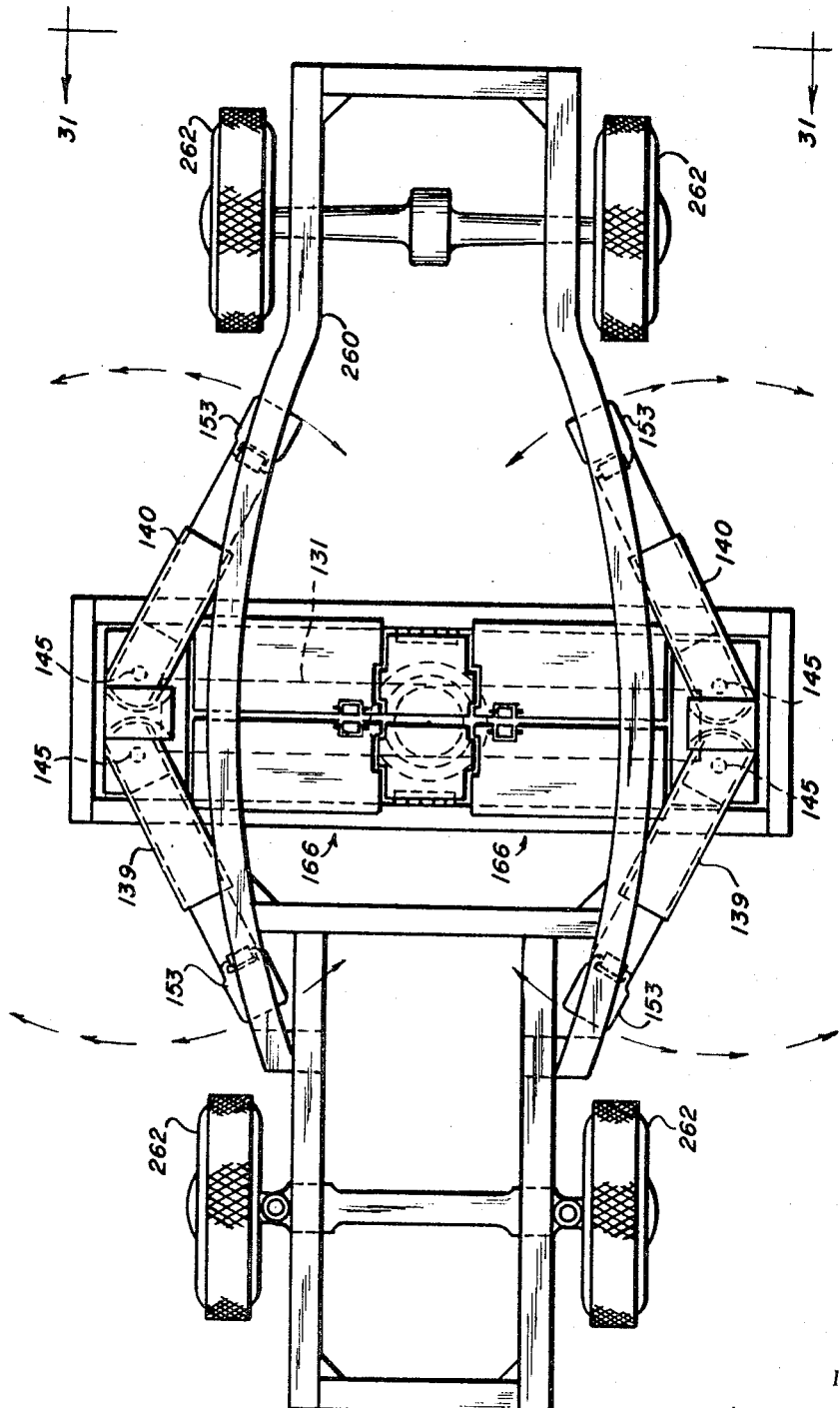
FIGURE 27 is a plan view of the lift shown in FIGURE 3 showing a vehicle frame and wheels.
Figure 28:
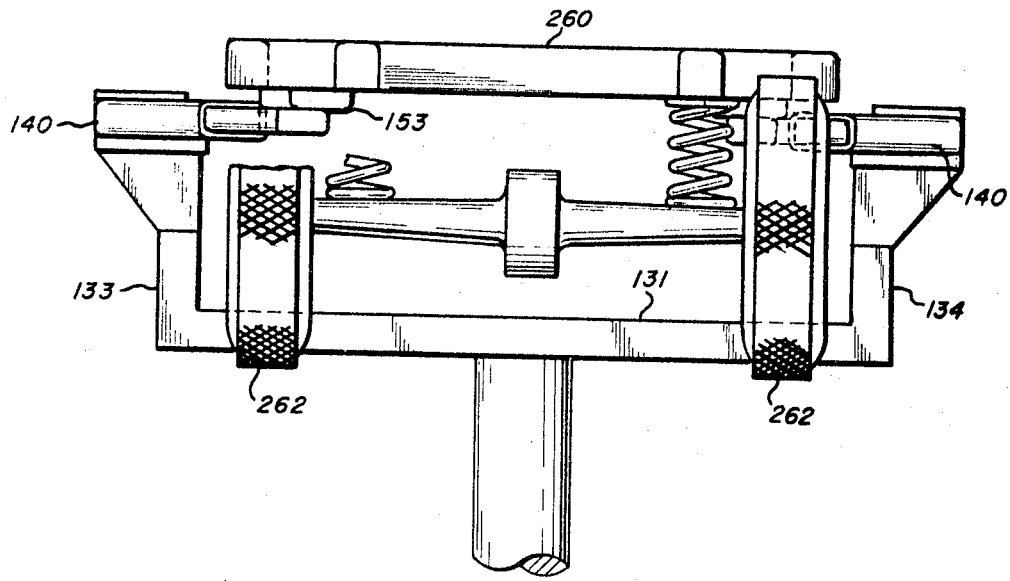
FIGURE 28 is a view taken along the line 31—31 of FIGURE 30.

The lever 129 which is utilized to rotate the shaft 128 in order to appropriately move the cam member 127 which serves to manipulate the actuating rod 123 is provided with a return roller 209 and handle 210 to assure that the lever 129 is always in the same position for a reason which will be described hereinafter, a cam block 212 is mounted in the enclosure 32 as shown in FIGURES 1, 2 and 16. The cam block is simply located in a position to engage the return roller when the superstructure moves downwardly into the enclosure forcing the lever 129 to assume specifically the position shown in FIGURE 16.

In order to utilize the vehicle lift of the present invention a vehicle is driven between vertical stanchions 133 and 134 and more specifically the mounting supports 136 carried thereby in the down or lowered position of the vehicle lift. The swinging arms 139 and 140 are preferably aligned during this operation as shown in FIGURE 3. After the vehicle has been driven into a position with the center of gravity substantially directly above the piston 43, the pad members 153 are manipulated to a position both horizontally and vertically to engage the frame of the vehicle. A very wide range of frames may be engaged because of the telescoping construction which enables the swinging arms to be elongated and various vertical positions can be accommodated because of the construction of the pad members which vertical positions have been described in detail hereinbefore, in connection with the discussion of FIGURES 20 through 23. After the pad members have been appropriately aligned with the frame of the vehicle which in present day automobiles extends quite closely to the sides of the automobile, the hand valve 66 (FIGURE 2) is appropriately manipulated to admit air under pressure through conduit 65 through the flattened tube 68 and up through the air supply tube 71 and telescoping tube 73 through the restricted opening 79 and into the hollow piston construction between the oil level 48 and the plate 45. Assuming that there is a sufficient oil level 48 in order to cause the float 88 to close the air valve assembly (which is the condition shown in FIGURE 7) then sufficient pressure will be built up in order to initially slowly raise the piston.

Figure 11:
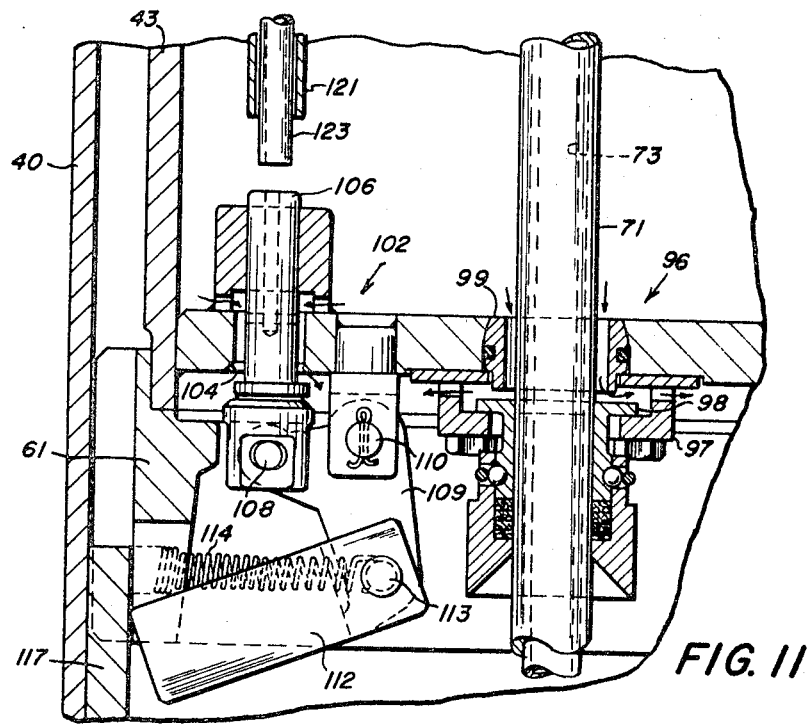
FIGURE 11 is an enlarged fragmentary view of the same portion of the piston as shown in FIGURE 10 but showing the piston partially raised with respect to the cylinder.
Figure 10:
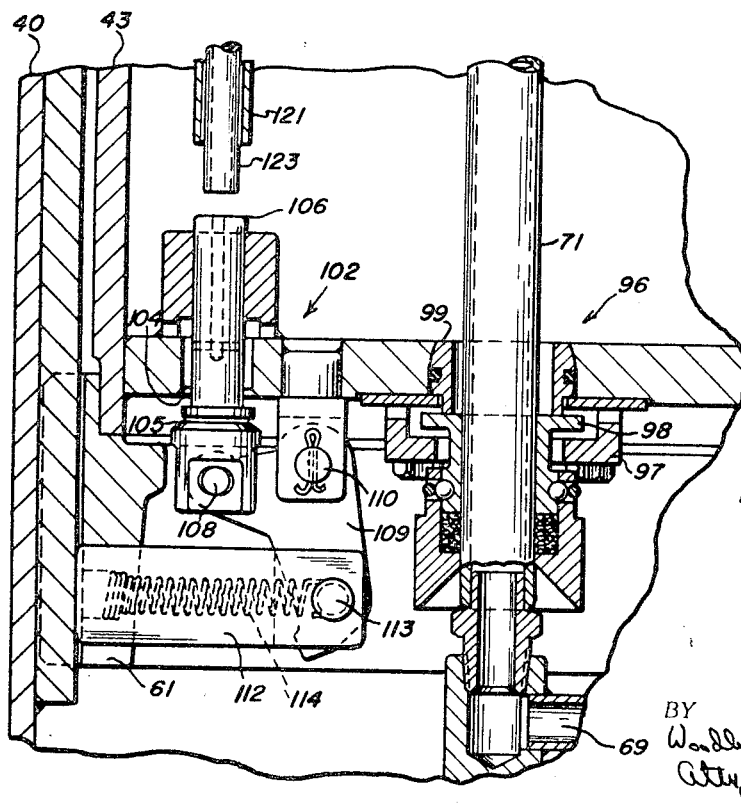
FIGURE 10 is an enlarged fragmentary view of the lower portion of the piston and cylinder arrangement in the position shown in FIGURE 4.

When the openings 77 have cleared the top of the air supply tube 71 as the piston is raised, compressed air will be introduced much more rapidly into the hollow piston construction with subsequent rapid raising of the piston to the desired level. On the upward movement of the piston hydraulic fluid contained therein passes into the cylinder through the check valve assembly 96 and also through the hydraulic control valve 102 until the control valve is carried to the top of the interference bar 117. At this point the hydraulic control valve closes because the latch 112 is not restrained from movement by the interference bar, under the action of spring 114. When the desired level has been reached, the operator of the lift manipulates the hand valve 66 so as to shut off compressed air to the piston. The air pressure may at this time be released by proper manipulation of valve 66. In this position the hydraulic control valve 102 is closed and the force of the hydraulic fluid in the cylinder 40 acts upon the check valve assembly 96 keeping it closed. This is the position of the ports shown in FIGURE 12 with the exception that the valve assembly 96 would be closed. As a result the piston will not move downwardly in the cylinder. With the hydraulic control valve 102 in the closed position the latch 112 is closely adjacent the inner wall of the cylinder in alignment with a safety stop 119 thereby preventing any accidental lowering of the piston should there be a failure in the hydraulic system. FIGURE 10 shows the position of the two valves 96 and 102 when the piston is at its lowest position in the cylinder. FIGURE 11 demonstrates the position of the two valves on the upward movement of the piston just before the latch member 112 clears the top of the interference bar 117. FIGURE 12 demonstrates the position of these two valves with the lift just reaching its up position or in the up position with the air pressure still on and FIGURE 13 demonstrates the position of these two valves when in the proper position to permit downward movement of the piston. Should the piston move downwardly to engage latch 112 with stop 119 because of a hydraulic fluid malfunction, the design is such that an operator cannot by lever 129 release the latch. This assures that the lift will not be operated while in a dangerous condition.

When it is desired to lower the lift all the way or merely to a slightly lower level, it is necessary that the air pressure be released from the hollow piston construction and the operator of the lift then manipulates the lever 129 by means of the handle 210 right at the vehicle which serves to rotate the shaft and cam member in a clockwise direction as viewed in FIGURE 2, 16 and 26 which causes the cam member 127 to push the actuating rod down which in turn engages the stem portion 106 of the valve 105 thereby opening the valve and moving the latch 112 out of alignment with a safety stop 119. This permits hydraulic fluid to be displaced from the cylinder into the piston with subsequent lowering of the lift. When it is desired to stop this lowering of the lift, the lever 129 is moved back to the position shown in FIGURE 16 which causes disengagement of the actuating rod with the stem portion 106 of the valve 105 and the valve closes and the latch 112 goes back to a position to engage a safety stop 119. This can be continued until the latch 112 reaches the interference bar 117 at which time the interference bar will not again permit closing of the valve member and as a result the piston and lift travel all the way to their lowermost position.

The lever 129 is located on the superstructure at a position whereby when the latch 112 reaches the interference bar the lever is reaching the enclosure 32. If the lever member be left in a position other than that shown in FIGURES 2 and 16, it will be returned to this position upon movement back into the enclosure 32 by engagement of the return roller 209 with the cam block 212. If the operator of the lift desires to re-raise the lift from some intermediate position after the air pressure has been exhausted from the hollow piston construction, it is only necessary that he actuate the valve 66 so as to re-introduce compressed air back into the hollow piston construction and the valve 90 will be carried by the action of the compressed air traveling through the annular entranceway 92 back to its closed position. The openings 94 will not be sufficient to transmit all of the compressed air because the air in this position will be traveling directly through the openings 77 into the hollow piston construction.

It will be appreciated from the above by those skilled in the art that with the lift in the raised position and carrying a vehicle, the underside of the vehicle is substantially unobstructed which is extremely desirable from the standpoint of mechanics working on the vehicle in doing work such as replacing exhaust systems and repairing differentials and transmissions. The only member extending across the underside of the vehicle is the cross beam 131 and because of the vertical stanchions 133 and 134 the cross beam or cross support member is what might be referred to as in a dropped position giving a mechanic a great deal of room between the top of the cross beam and the underside of the vehicle. This vertical height can be adjusted as desired in any particular case. In the case of conventional automobile frames of present manufacture the swinging and telescoping arms as well as the pad members do not serve as any substantial obstruction underneath of the vehicle since the frame which the pad members engage are quite close to the sides of the automobile. This exposure of substantially the entire underside of a vehicle presents advantages to those skilled in the art which require little or no further discussion and particularly when considered in the light of the single post construction. The present construction as hereinabove described also enables those skilled in the art to have a vehicle lift with nothing more exposed above the floor level in the down position of the lift than the thickness height of the arms and the pad members. The present construction provides a full hydraulic lift without the necessity of the conventional air-oil tank and the provision of the lever 129 and its subsequent linkage enables a mechanic to control the lowering and stopping of the lift right at the superstructure where the vehicle upon which he is working is located. It will also be seen that the building in of the safety leg into the jack construction provides a convenient safety device without the usually exposed parts. The present invention provides a vehicle lift where the operator of a vehicle does not have to drive his vehicle over any parts of the lift above floor level in the lowered position of the lift but merely has to drive the same between the swinging arms on either side of the vehicle. The present vehicle lift also provides a jack construction whereby the device will not lift if the hydraulic oil level is dangerously low. FIGURES 30 and 31 show the frame 260 and wheels 262 of a vehicle relative to the lift shown in FIGURES 1, 2 and 3 and discussed completely hereinabove.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A vehicle lift including in combination a cylinder, a piston positioned in said cylinder and comprising a generally hollow construction, said piston being movable between upper and lower positions in said cylinder, said piston and cylinder each having upper and lower end portions, an air supply tube extending into said piston, restricted opening means in said air supply tube permitting a low airflow rate into said piston in said lower position thereof and permitting a high airflow rate into said piston in positions of same above said lower position, an air valve in said upper end portion of said piston being movable between open and closed positions, said air valve in said lower position of said piston being closed upon sufficient fluid level therein and being open upon insufficient fluid level and said low airflow rate being insufficient to close said air valve, said high airflow rate in positions above said lower position of said piston being sufficient to hold said air valve closed, a fluid valve in said lower end portion of said piston and being movable between open and closed positions, said fluid valve being in said open position upon upward movement of said piston thereby permitting fluid flow from said hollow piston to said cylinder and said fluid valve being in said closed position upon downward movement of said piston thereby prohibiting fluid flow from said cylinder to said hollow piston, a control valve located in said lower end portion of said piston, said control valve being movable between an open position whereat fluid flow is permitted between said piston and cylinder and a closed position whereat fluid flow is prohibited between said piston and cylinder.

2. A vehicle lift as claimed in claim 1, wherein a safety latch member is connected to said control valve and is moved to an unlatched position in the open position of said control valve and to a latched position in the closed position of said control valve, a safety stop in line with said safety latch member, means acting on said safety latch member tending to move same to said latched position and said control valve to said closed position, and means for moving said control valve to said open position.

3. A vehicle lift as claimed in claim 1, wherein said air valve includes a float member secured thereto which floats in the fluid and with sufficient fluid holds said air valve closed in the lower position of said piston.

4. A vehicle lift as claimed in claim 1, wherein said fluid valve comprises a chuck valve.

5. A vehicle lift as claimed in claim 2, wherein an interference member is connected to the cylinder and extends upwardly and a given distance to engage said safety latch member and while so engaged keeping said control valve open.

References Cited

UNITED STATES PATENTS

| 1,841,900 | 1/1932 | Lunati | 91—4 |
| 1,899,534 | 2/1933 | Steedman | 91—4 |
| 3,060,900 | 10/1962 | Pelouch | 91—4 |
| 3,363,511 | 1/1968 | Huff et al. | 91—4 |

PAUL E. MASLOUSKY, *Primary Examiner.*

U.S. Cl. X.R.

91—410, 422; 92—81